United States Patent
Youd et al.

(10) Patent No.: US 8,052,129 B2
(45) Date of Patent: *Nov. 8, 2011

(54) STEEL SPRING DAMPER

(76) Inventors: Jason B. Youd, White Lake, MI (US);
Ronald N. Check, Brighton, MI (US);
Jonathan E. Slade, Fenton, MI (US)

( * ) Notice: Subject to any disclaimer, the term of this patent is extended or adjusted under 35 U.S.C. 154(b) by 346 days.

This patent is subject to a terminal disclaimer.

(21) Appl. No.: 11/796,010

(22) Filed: Apr. 25, 2007

(65) Prior Publication Data

US 2008/0073167 A1   Mar. 27, 2008

Related U.S. Application Data

(60) Provisional application No. 60/794,801, filed on Apr. 25, 2006.

(51) Int. Cl.
*F16F 1/06* (2006.01)
*F01L 3/10* (2006.01)

(52) U.S. Cl. .................................. 267/179; 267/204

(58) Field of Classification Search ............. 267/166, 267/167, 170, 171, 174, 178, 179, 90, 94, 267/204, 216, 286, 291; 123/90.65, 90.67
See application file for complete search history.

(56) References Cited

U.S. PATENT DOCUMENTS

| | | | |
|---|---|---|---|
| 1,191,658 A | 7/1916 | Brown | |
| 1,696,797 A | 11/1927 | Fornaca | |
| 1,746,220 A | 9/1928 | Manning | |
| 1,928,678 A | 11/1932 | Sjolander | |
| 2,005,089 A | 6/1935 | Krebs | |
| 2,117,433 A | 5/1938 | Krebs | |
| 2,396,347 A | 9/1943 | Sanders | |
| 2,821,971 A | 2/1956 | Benz et al. | |
| 3,110,298 A | 11/1963 | Giles | |
| 3,198,188 A | 8/1965 | Heid, Jr. | |
| 3,326,562 A | 6/1967 | Deuring | |
| 3,336,913 A | 8/1967 | McCormick | |
| 3,459,166 A | 8/1969 | Updike et al. | |
| 4,317,436 A | 3/1982 | Barnhart et al. | |
| 4,470,383 A | 9/1984 | DeBolt | |
| 4,479,461 A | 10/1984 | Felice et al. | |
| 4,538,563 A | 9/1985 | Mayers | |
| 4,732,372 A * | 3/1988 | Dickhart et al. | 267/204 |
| 4,993,376 A | 2/1991 | Fukutome et al. | |
| 5,246,215 A | 9/1993 | Takamura et al. | |
| 5,322,039 A | 6/1994 | Kinsey | |
| 5,370,423 A * | 12/1994 | Guest | 285/39 |
| 7,370,855 B2 * | 5/2008 | Youd et al. | 267/179 |
| 2004/0222579 A1 | 11/2004 | Adoline et al. | |

* cited by examiner

*Primary Examiner* — Melody Burch
(74) *Attorney, Agent, or Firm* — Ronald R. Kilponen

(57) ABSTRACT

A damper is shown for damping the movements of a spring. The spring is housed within the damper. The side walls of the damper have inverted T-shaped cutouts and hinge members resulting in flexure of the side walls when the spring is compressed or released. A steel band can be housed on the outside surface of the side walls providing biasing of the inside of the side walls against the outside of the spring thereby damping movement of the spring.

2 Claims, 6 Drawing Sheets

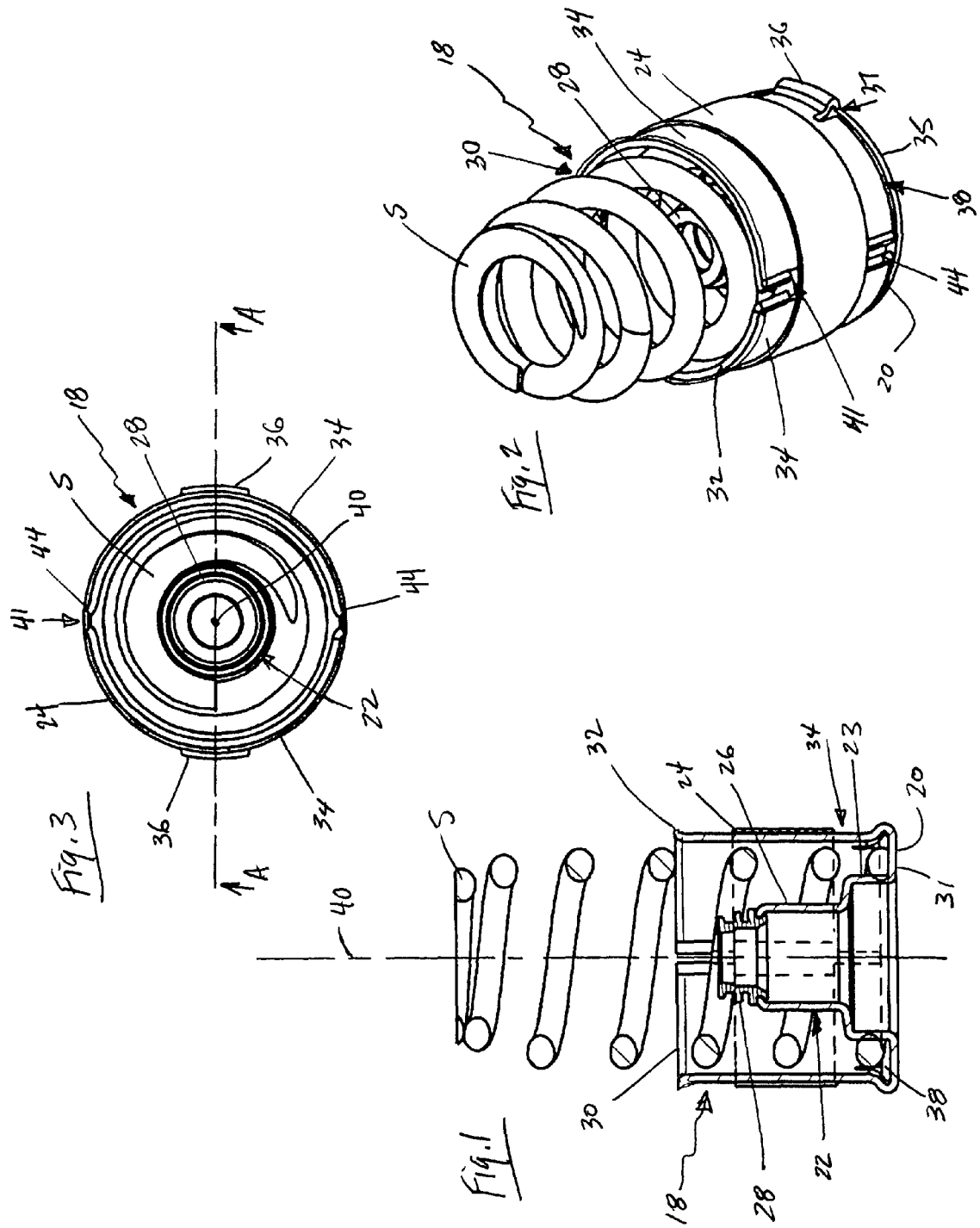

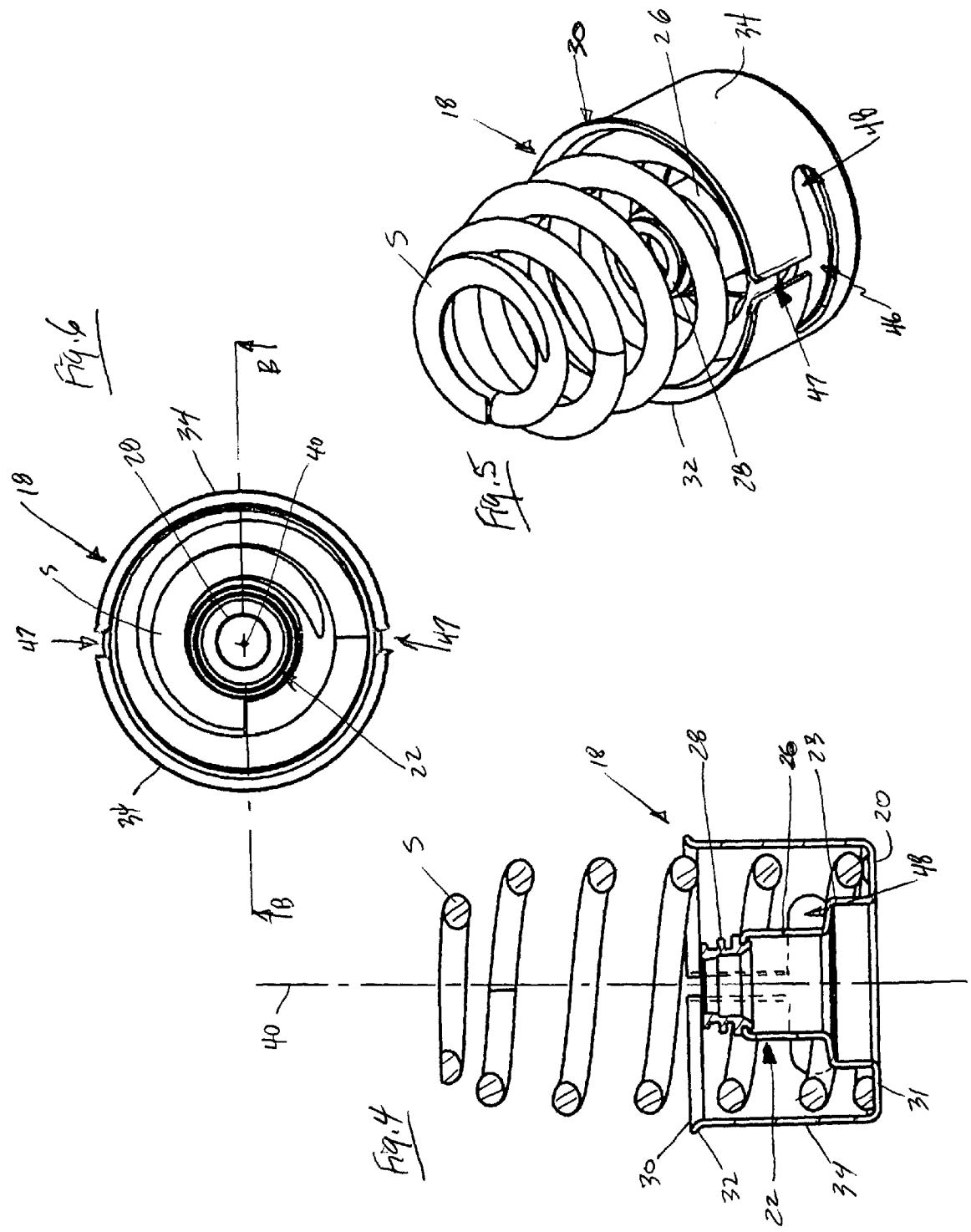

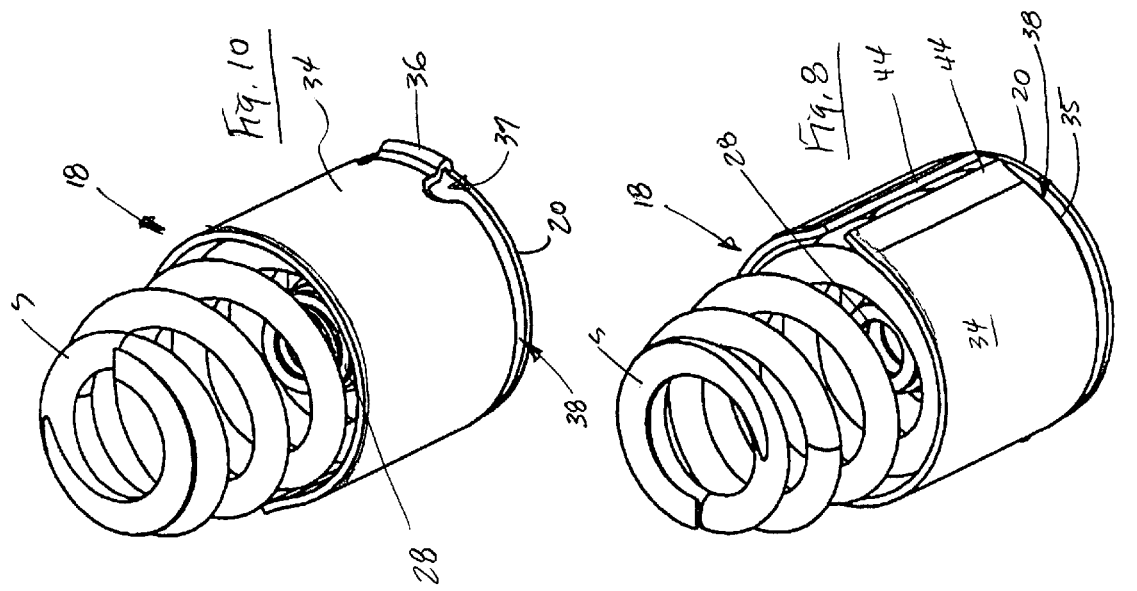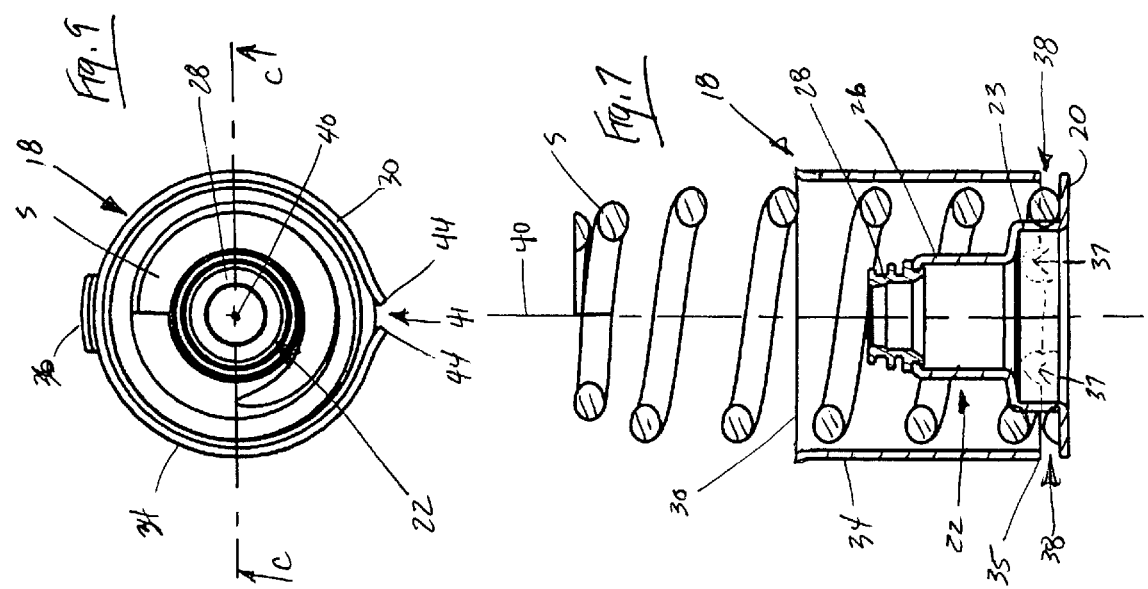

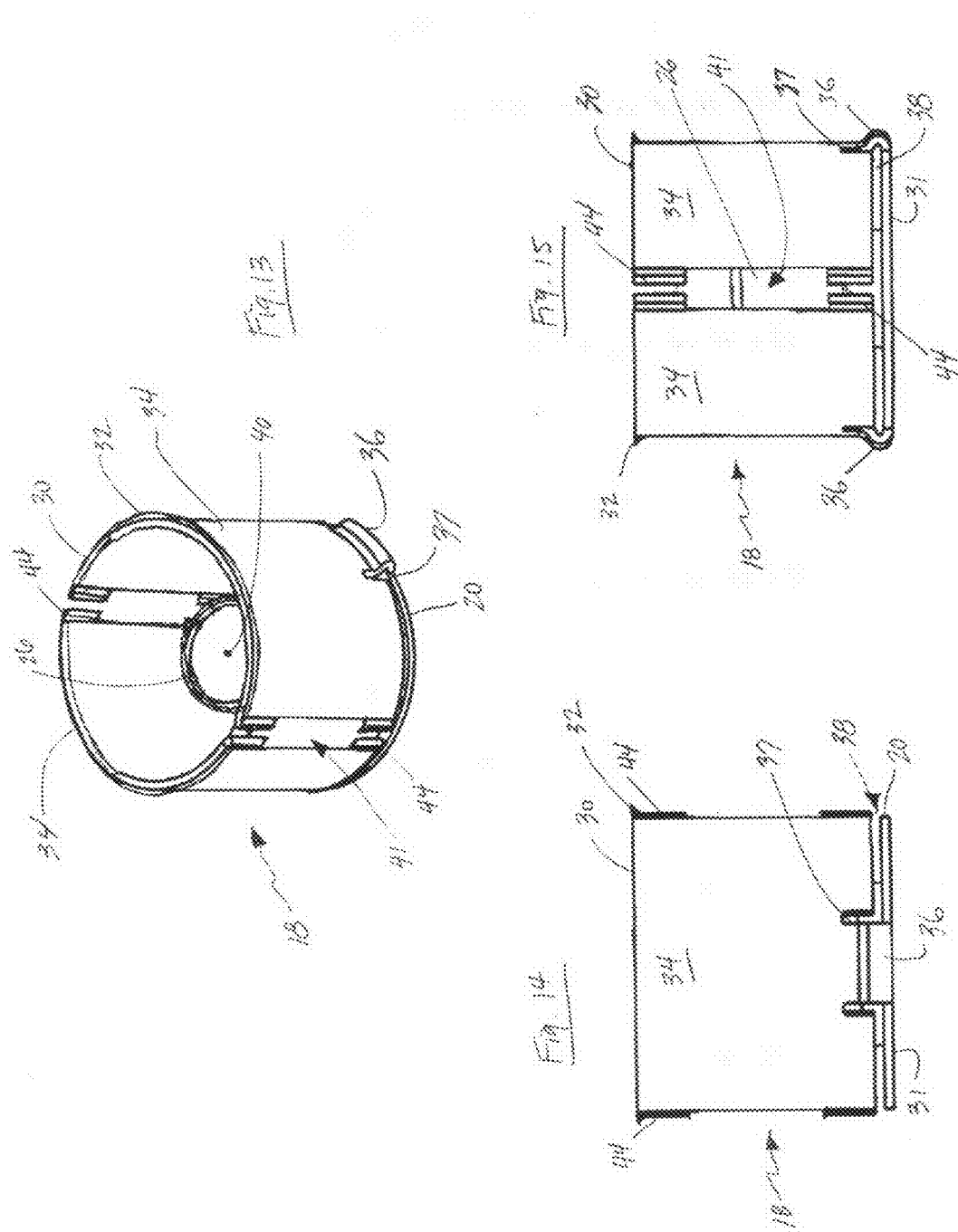

STEEL SPRING DAMPER

CROSS REFERENCE TO RELATED APPLICATIONS

This application claims the benefit of Provisional application for Patent Ser. No. 60/794,801 filed on Apr. 25, 2006.

FIELD

The present versions of these embodiments relate generally to the field of dampers for springs and more particularly to the damping of valve springs in engines. While valve springs are specifically discussed, these dampers could be used for other applications such as suspension springs, fuel injector springs, clutch springs and others.

BACKGROUND

These embodiments relate to the field of dampers for springs, and more particularly to the damping of valve springs in engines. In order for four cycle internal combustion engines to run, there needs to be a way of allowing the fuel-air mixture into the combustion chamber. When the fuel-air mixture has been burned, then the exhausted fuel-air mixture and combustion products must exit the combustion chamber. This has been done in the background art by providing at least one valve per cylinder that opens and closes to allow the fuel-air mixture into the combustion chamber and traditionally at least one other valve per cylinder to allow the spent fuel-air mixture and combustion products to leave the combustion chamber. The valves traditionally have springs which interact with the valve and are provided typically with a rotating cam to depress and release the valve.

The valves are opened by having the cam pressing on the valve forcing the valve toward the combustion chamber thus opening the valve and compressing the valve spring. When the valve is released, the valve spring moves or returns the valve to the closed position. When the valve is opened the spring compresses and upon release of the valve, the spring returns the valve to the closed position.

This type of system works relatively well for most applications, but today with the smaller, higher revolution per minute (rpm) engines, the need for decreased weight in vehicles, the need for higher efficiency engines and other reasons, the current valve spring system is not as desirable. As these smaller engines are operated at higher rpms for longer periods of time, the valve springs do not have time to completely stop oscillating when the valve is fully engaged and when the valve is fully released. This oscillation of the valve springs can lead to leakage when the valve is released and decreased flow when the valve is engaged to allow fuel and air into the cylinder. The valves can also float or flutter, meaning that the valves are not operating as efficiently as would be desired.

One way to discourage the float or flutter is to get the valve and specifically the valve spring to stop oscillating when opened and closed. Once the valve is closed, in a perfect system, both the valve and spring would stop moving. Conversely, once the valve is opened, both the valve and spring would stop moving. This does not occur in the real world and the valve spring continues to move up and down, or oscillate, for a finite time period and then stops. It is desirable to have the spring stop moving as quickly as possible when compressed and also when released.

Much of the background art also uses a separate valve stem seal to discourage the lubricating oil from penetrating into the combustion chamber. It would be beneficial to have this valve stem seal incorporated into the spring damper to decrease manufacturing costs and also to ease assembly.

The damping of oscillations has traditionally been done by engineering the spring or spring materials to decrease this spring oscillation. Current engineering has approached the limit for damping these oscillations with spring engineering and spring materials. Some background art shows the use of dampers attached to the spring to lessen these oscillations.

A damper can be any material that will stop a spring from oscillating. Various embodiments have been developed to stop the spring from oscillating such as a dual spring system, installing a damper on the outside of the spring, installing a damper on the inside of the spring. Many of the current systems have significant disadvantages to them that do not allow the optimum damping of the valve springs. These systems can be costly and difficult to install and maintain and some require re-engineering the cam shafts and cylinder heads where the valves and valve springs are located.

For the foregoing reasons, there is a need for a spring damper that will discourage the spring from oscillating when the spring is compressed and released.

SUMMARY

In view of the foregoing disadvantages inherent in the level of the art in valve springs there is a need for a spring damper.

A first object of these embodiments is to provide a damper that is relatively cost effective to manufacture and install.

Another object of these embodiments is to provide a damper that will dampen the valve spring oscillations more effectively and efficiently than those currently available.

It is yet another object of these embodiments to provide a damper that will have a long life cycle and maintain damping performance over a longer time period with minimal wear or damage to the spring.

Another object of these embodiments is to provide a damper resulting in minimal wear to the spring surface and limited metal filings from spring wear which can then contaminate the lubrication system of the engine.

Another object of these embodiments is to provide a spring damper that incorporates a valve stem seal to simplify assembly and reduce costs.

It is a still further object of these embodiments is to provide a damper that can be installed without redesigning the valve spring, cylinder head or engine.

These together with other objects of these embodiments, along with various features of novelty which characterize these embodiments, are pointed out with particularity in the detailed description and forming a part of this disclosure. For a better understanding of these embodiments, their operating advantages and the specific objects attained by its uses, reference should be had to the accompanying drawings and descriptive matter in which there is illustrated a preferred embodiment.

BRIEF DESCRIPTION OF DRAWINGS

FIG. 1 shows a side cutaway view of one embodiment of a damper and stem seal along A-A of FIG. 3

FIG. 2 shows a perspective view of one embodiment of the damper in FIGS. 1,3

FIG. 3 shows a top view of one embodiment of the damper of FIGS. 1,2.

FIG. 4 shows a side cutaway view of one embodiment of a damper along B-B of FIG. 6.

FIG. 5 shows a perspective view of one embodiment of the damper in FIGS. 4,6.

FIG. 6 shows a top view of one embodiment of the damper of FIGS. 4,5.

FIG. 7 shows a side cutaway view of one embodiment of a damper along C-C of FIG. 9.

FIG. 8 shows a perspective view of one embodiment of the damper of FIGS. 7,9,10.

FIG. 9 shows a top view of one embodiment of the damper of FIGS. 7,8,10.

FIG. 10 shows another perspective view of one embodiment of the damper of FIGS. 7,8,9.

FIG. 13 shows a perspective view of one embodiment of the damper alone.

FIG. 14 shows a side view of one embodiment of the damper without alone.

FIG. 15 shows another side view of one embodiment of the damper alone.

DETAILED DESCRIPTION OF THE PREFERRED EMBODIMENTS

Figure 11:
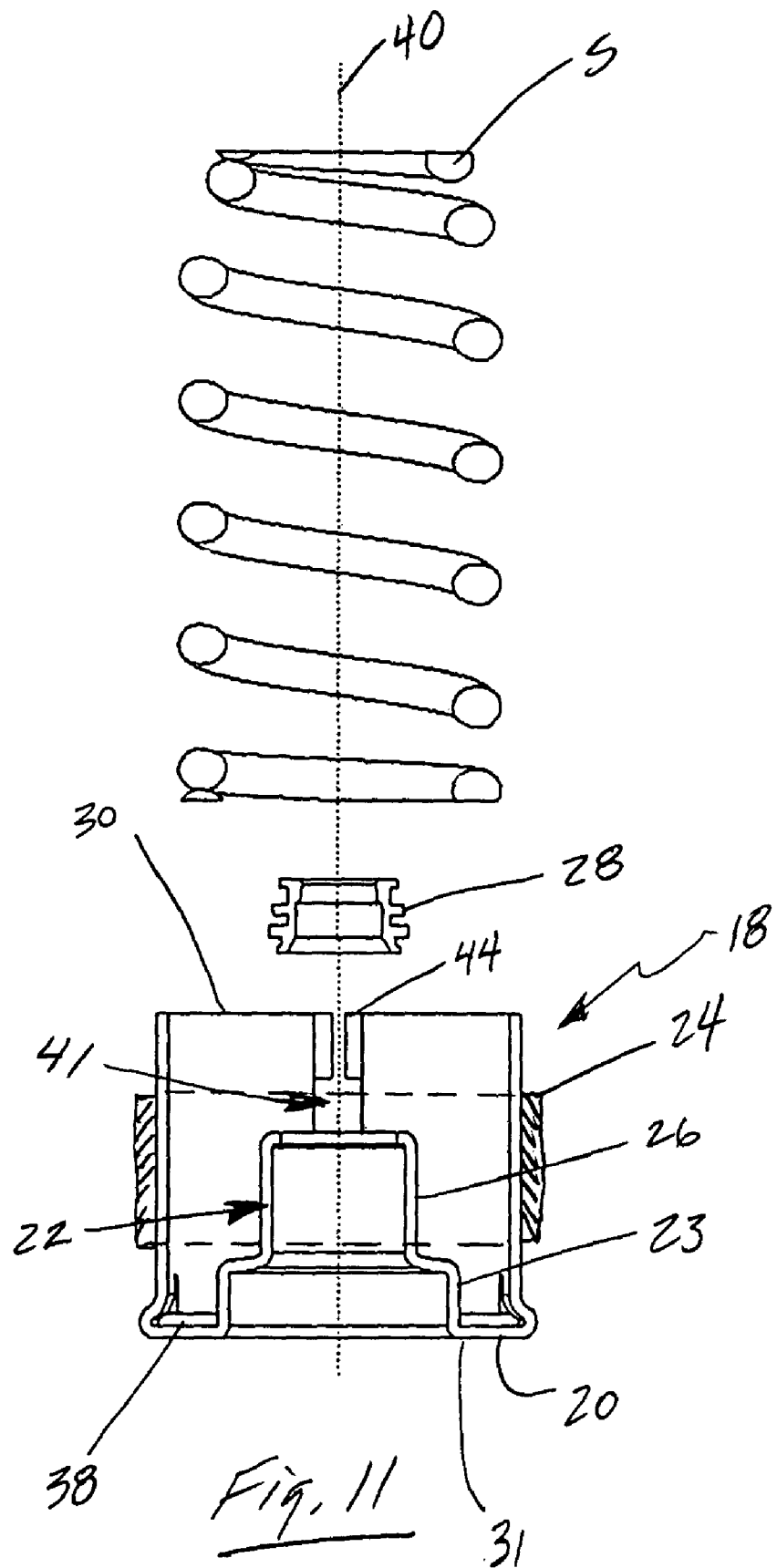
FIG. 11 shows an exploded view of one embodiment of the damper.

FIG. 1 shows a cutaway view of a damper 18 of FIG. 3 along line A-A. The damper 18 is generally cylindrical in shape, is made from steel sheet and houses spring S. One end of the spring S rests on the platform 20 of the damper 18 and the other end of spring S generally extends from the top 30 of damper 18. The damper 18 has a central axis 40 with a stem housing 22 extending from the platform 20 toward the top edge 30 of the damper 18 and centered on the central axis 40. The stem housing 22 is formed from a relatively rigid cylinder 26 extending from platform 20 and topped with a pliable seal 28. The seal 28 seals against the valve stem (not shown) to prevent oil leakage.

The top 30 has a formed upper edge 32. This upper edge 32 eases the assembly of spring S into damper 18. Damper 18 is generally formed from with two side walls 34. Each of the side walls 34 is connected to the platform 20 with a hinge member 36. The width and angle of the hinge members 36 can be adjusted or changed to provide different properties to the flexure of the side walls 34 against the spring S. This provides a gap 38 between the side walls 34 and platform 20 such that side walls 34 essentially float in a position above the platform 20.

The side walls 34 are also separated from one another by vertical spacings 41 which are approximately 180 degrees apart and parallel to central axis 40. The edges of the sidewalls 34 at vertical spacing 41 are turned away from the central axis 40 providing vertical lips 44 on each end of vertical spacing 41.

The vertical lips 44 are not present where the band 24 crosses over the vertical spacing 41. In other words, vertical lips 44 are removed so that band 24 contacts the outer surface of the side walls 34. Band 24 biases side walls 34 toward central axis 40 bending at hinge members 36. Band 24 is located between the top 30 and bottom edge 35 of side walls 34. When the side walls 34 are biased toward central axis 40, the bottom edge 35 still maintains separation from platform 20 maintaining gap 38. The band 24 can be manufactured from spring steel or other material with similar properties.

The hinge member 36 can vary in width thereby providing more or less flexure or movement of side walls 34 against spring S. The band 24 also provides bias to side walls 34 against spring S. When the damper 18, band 24 and spring S are installed, the cycling of the spring S is damped by the side walls 34 contacting the outer surface of spring S as it compresses and decompresses. The spring S thus damps or ceases movement quicker than if no damper 18 and band 24 are installed.

FIGS. 13, 14, and 15 show an isolated view of the damper alone. FIG. 13 shows a perspective view of the damper 18 and can be seen one embodiment of the T-shaped slot having a vertical spacing 41 and gap 38 near the bottom. The hinges 36 are shown having a cutout 37 on each side of the hinges 36. The two pair of vertical lips 44 can be seen near the top of the vertical spacing 41 and two pair of vertical lips 44 can be seen near the bottom of the vertical spacing 41.

FIG. 4 shows a cutaway view of another embodiment of damper 18 and spring S along B-B in FIG. 6. FIG. 5 shows a perspective view and FIG. 6 shows a top view of damper 18 and spring S.

In this embodiment damper 18 has a top edge 30 with a formed upper edge 32 where upper edge 32 is bent away from central axis 40. At the bottom of damper 18 is a platform 20. A stem housing 22 is affixed to the platform 20 at one end and extends from platform 20 terminating at a position near the top edge 30. The stem housing 22 is approximately centered on central axis 40. The stem housing 22 can have a step 23 having a larger diameter than an attached cylinder 26. The top of cylinder 26 is affixed to a seal 28 which seals the valve stem (not shown) sealing the lubricating oil from penetrating the seal 28 to possibly enter the combustion chamber (not shown). The seal 28 also aids in centering the spring S and Damper 18 relative to the valve stem (not shown). The bottom of cylinder 26 is attached to the step 23. The step 23 is attached to the platform 20.

The embodiment shown in FIGS. 4, 5, 6 shows T shaped slots 46 (see FIG. 5) approximately 180 degrees from one another in the side walls 34. The slots 46 have a vertical component 47 extending from the top edge 30 toward the platform 20 terminating at the circumferential component 48. Circumferential component 48 extends some pre-defined distance radially in the side wall 34 of damper 18. The length of the vertical component 47 and circumferential component 48 effect the amount of flexure in the side walls 34 of the damper 18 and can be adjusted in position and length depending upon the design parameters of this embodiment of damper 18.

FIGS. 7,8,9,10 show another embodiment of damper 18. FIG. 7 is a cutaway view of damper 18 and spring S along C-C of FIG. 9. In this embodiment of damper 18 there is only one hinge member 36, FIGS. 9, 10. Opposite hinge member 36 is a single vertical spacing 41 extending from the top edge 30 to the platform 20. The edges or vertical lips 44 of vertical spacing 41 are bent away from central axis 40. The hinge member 36 has on either side cutouts 37, one shown in FIG. 10. The length of the hinge member 36 and the size of cut outs 37 can be varied and adjusted depending on the design parameters for damper 18. FIG. 7 also shows a gap 38 such that side wall 34 essentially floats over platform 20.

Attached to platform 20 and centered on central axis 40 is step 23. Attached to step 23 is cylinder 26 extending toward the top edge 30 of damper 18. At the top of cylinder 26 is seal 28. Seal 28 is used to seal the valve stem (not shown) as has been discussed prior.

The embodiment shown in FIGS. 7,8,9,10 differ from those of FIGS. 1,2,3 where only one hinge member 36 is used, and therefore there is only one vertical spacing 41 with corresponding vertical lips 44.

Figure 12:
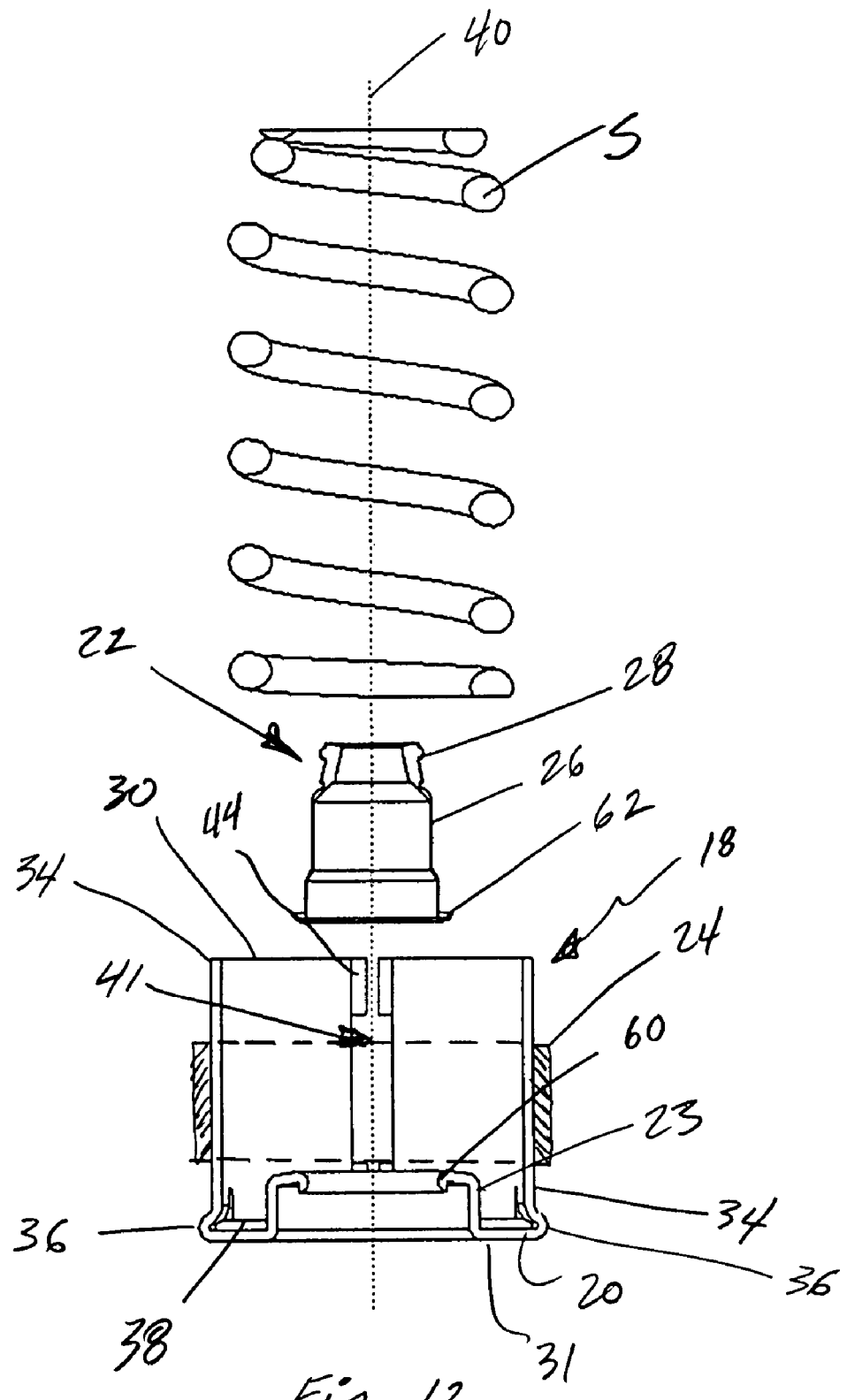
FIG. 12 shows an exploded view of one embodiment of the damper with a modified stem seal.

FIG. 12 shows another embodiment of the damper 18. In this embodiment, stem housing 22 is attached to step 23. Step 223 has an upper lip 60 which is formed to interact with edge 62 of stem housing 22. Stem housing 22 still has a seal 28 which is separately manufactured and affixed to the top of cylinder 26. The stem housing 22 is then inserted into the damper 18 where the edge 62 engages with the upper lip 60 of the damper 18 such that the stem housing 22 is retained by damper 18. This embodiment allows multiple pieces which can be better customized for many different applications and separately manufactured. This damper 18 also has a band 24 located between pairs of vertical lips 44 to bias the inner surface of side wall 34 against the outer surface of the spring S, thereby damping spring oscillations.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

The invention claimed is:

1. A device for damping oscillations in a spring of an engine valve having a stem, the device comprising:
    a cup shaped damper having a top edge and a bottom, a side wall having an inner surface and an outer surface, two hinge members attaching the side wall to the bottom, a vertical cutout on each side of the hinge members;
    an axis in the center of the damper, a hole in the bottom, the hole centered on the axis;
    a pair of T-shaped slots bifurcating the side wall into two side walls, the T-shaped slots having a vertical spacing and a circumferential gap, the vertical spacing starting near the bottom and extending to and open at the top edge, the circumferential gap adjacent to the bottom extending from one hinge member to the other hinge member and approximately centered on the vertical spacing;
    two pair of vertical lips on each vertical spacing, one lip located on each side of the vertical spacing near the top edge and one lip located on each side of the vertical spacing near the bottom, the lips bent away from the axis;
    the bottom extending from near the inner surface toward the axis terminating at a step;
    the step attached to a cylinder, the cylinder extending towards the top edge, the step and cylinder centered on the axis;
    a seal affixed to the cylinder near the top edge, the seal for sealing the stem of the valve;
    a band located on the outer surface of the side walls, the band located and retained between the top and bottom vertical lips; and
    the band providing radial tension to the outer surface of the side walls such that the inner surface of the side walls contacts the spring and the spring oscillations are damped.

2. The device of claim 1, wherein:
the vertical spacing is parallel to the axis.

* * * * *